3,085,121
PROCESS FOR THE PRODUCTION OF
1,3-CYCLOHEXADIENE
Howard R. Guest, Charleston, and Ben W. Kiff, Ona, W. Va., assignors to Union Carbide Corporation, a corporation of New York
No Drawing. Filed July 14, 1960, Ser. No. 42,776
7 Claims. (Cl. 260—666)

This invention relates to an improvement in the process of preparing 1,3-cyclohexadiene.

More specifically, this invention relates to a novel process for converting 2-cyclohexen-1-ol to 1,3-cyclohexadiene.

1,3-cyclohexadiene is well-known in the art. However, it has never been fully exploited due to its comparatively high cost of manufacture. The art has employed various methods of synthesis but none has been found to be acceptable.

One of the prior art methods was the chlorination of cyclohexene followed by dehydrochlorination:

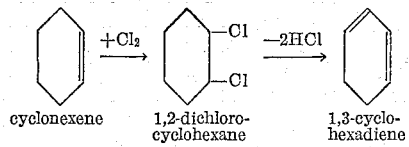

cyclohexene   1,2-dichloro-   1,3-cyclo-
               cyclohexane   hexadiene

This method gave very poor yields of the diene. Additionally, relatively large amounts of chlorine had to be reacted which rendered the process economically unattractive.

In another approach, 2-cyclohexen-1-yl acetate was decomposed by heating it in the liquid phase in the presence of potassium acid sulfate.

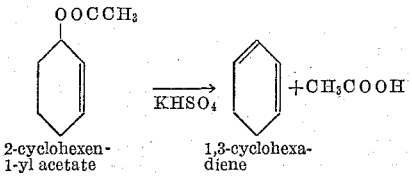

2-cyclohexen-   1,3-cyclohexa-
1-yl acetate       diene

This method also has some disadvantages. In the first place, the ester is formed with poor efficiency. Secondly, for each mole of diene produced there is liberated a mole of acetic acid which can have a serious effect of the economy of operation.

Finally, the art resorted to the liquid phase oxidation of cyclohexene, which is illustrated by the following equations:

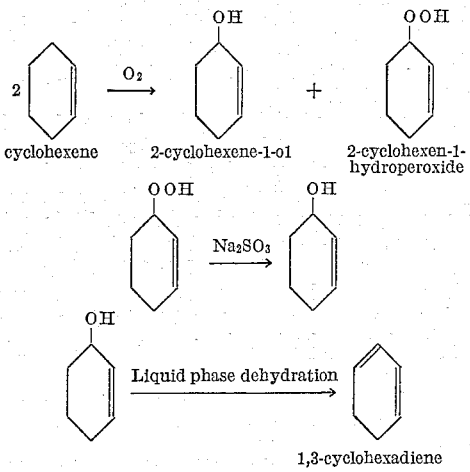

The difficulty with the above-described process is in the final step. The liquid phase dehydration of 2-cyclohexen-1-ol yields many products which have boiling points very close to each other. The difficulty that one would experience in separating these materials by distillation can be seen from their boiling points.

TABLE I

| Compound: | Boiling point |
|---|---|
| 1,3-cyclohexadiene | 80.5 |
| Benzene | 80.1 |
| Cyclohexane | 80.7 |
| Cyclohexene | 83 |
| 1-methylcyclopentene | 75 |

Thus, it is the object of this invention to provide an improved process for the preparation of 1,3-cyclohexadiene by the oxidation of cyclohexene.

It is still another object of this invention to provide a method of converting 2-cyclohexene-1-ol to 1,3-cyclohexadiene which is essentially quantitative so that prolonged and expensive separation techniques are not required.

It has now been found that the above objects can be obtained when 2-cyclohexene-1-ol is dehydrated in the vapor phase with a "solid phosphoric acid catalyst."

The term "solid phosphoric acid catalyst," as used in the specification and the claims, refers to the catalyst when phosphoric acid is mixed with any powdered inert material and dried. The inert powdered material is not critical and any powder which is inert to the reaction system can be employed. Examples of these powders include diatomaceous earth, flour, silica, mica, charcoal, sawdust, etc.

It is to be understood that by the term phosphoric acid, the ortho, meta, hypo and pyro forms are included. The preferred acid is orthophosphoric acid.

The process of this invention is caried out by passing the vapors of the 2-cyclohexen-1-ol over the solid phosphoric acid catalyst at temperatures in the range of 200–500° C. The preferred temperature range is from 250–350° C.

Although the 2-cyclohexen-1-ol can be fed into the reactor in an undiluted form, the reaction will also proceed if an inert diluent is employed. The diluent is not critical and any conventional substance which is inert under the reaction conditions is operable. Examples of diluents include nitrogen, helium, carbon dioxide and the vapors of inert liquids such as water or hydrocarbon.

The contact time of the alcohol vapors with the catalyst should be relatively short. Residence times of from 0.1 second to 5 seconds can be used. The preferred range is from 0.5 to 1.5 seconds. The oxidation of cyclohexene to obtain 2-cyclohexen-1-ol is well known in the art and is outside the scope of this invention. The oxidation of cyclohexene to the hydroperoxide and the reduction of the peroxide to 2-cyclohexen-1-ol is described by Farmer et al., Journal of the Chemical Society, 1942, page 121.

The following examples illustrate the liquid phase dehydration of 2-cyclohexen-1-ol.

EXAMPLE 1

To a distillation flask connected to a packed column 12 inches long and 1 inch in diameter, there was charged 100 g. of concentrated orthophosphoric acid. The acid was heated to 200° C. and there was slowly fed over a 1½ hour period 41 g. of 2-cyclohexen-1-ol. Volatile material was distilled overhead as it was formed. A total of 20 g. of distillate was collected. Of this 7 g. was water. The 13 g. of oil layer was analyzed chemically and was found to have only 54.9 percent 1,3-cyclohexadiene if all of the unsaturation were accounted for by that compound. If this were true the contained diene in the distillate would be only 7.15 g. which would indicate a 21.3 percent yield. The yield would be the same as the efficiency in this case since no unreacted 2-cyclohexen-1-ol was obtained.

EXAMPLE 2

To an apparatus similar to that described in Example 1 there were charged 32 g. of 2-cyclohexen-1-ol and 1 g. of powdered commercial montmorillonite catalyst (obtained from Salomon Bros., New York City, their code number K10SF). The kettle was heated to 118° C. and then slowly raised to 150° C. The heating period covered 45 minutes. No volatile material was formed. At the end of the reaction time the material in the kettle was a mass of sticky polymer.

The following example illustrates the novel process of this invention:

EXAMPLE 3

A catalyst was prepared in the following manner. Forty parts of diatomaceous earth (Filter-Cel obtained from Johns-Manville Corp., New York City) was charged to a mixer and to this was added 80 parts of 75 percent orthophosphoric acid and 16 parts of water. The mixer was operated for 2 minutes and stopped. The balls of catalyst thus formed were removed from the mixer and were roasted for 2 hours at 300° C. with a stream of hot air passing through them. The hardened balls of catalyst were screened to 4 x 12 mesh.

The reactor used for the experiment was a stainless steel tube 4 feet long and 1 inch in diameter equipped with a thermowell through which the temperature could be measured. The tube had an electrically wound jacket filled with a molten salt mixture to allow heat control. To the reactor there was charged 200 cc. of the phosphoric acid catalyst described above. This gave a catalyst bed 20 inches long. The space above the catalyst was filled with glass beads to allow an inert area to serve as a vaporizer. The effluent vapors passed through a condenser and thence to a receiver.

While the temperature was held in the range of 293 to 305° C. there was fed 980 g. of 2-cyclohexen-1-ol over a 3 hour period. The contact time under the conditions of the reaction was about 1.2 seconds in the catalyst zone. The make was collected and separated into layers. The lower layer of water weighed 150 g. and the oil layer weighed 786 g. This layer was analyzed by vapor phase chromatography. It contained 97.5 percent 1,3-cyclohexadiene. The chief impurity was 1.9 percent benzene. Other materials were present only in trace amounts. No unreacted 2-cyclohexen-1-ol was found. This material was distilled at atmospheric pressure. There was obtained 706 g. of distillate which contained 98 percent 1,3-cyclohexadiene, and only 1.4 percent benzene, 0.3 percent cyclohexene and 0.1 percent cyclohexane. The kettle contained only 34 g. of high boiling material—probably formed by polymerization of diene. The yield to distilled diene was 87 percent from the starting 2-cyclohexene-1-ol.

The following examples illustrate the criticality of the solid phosphoric acid catalysts over conventional vapor phase dehydration catalysts.

EXAMPLE 4

*Dehydration of 2-Cyclohexen-1-Ol Over a Synthetic Silica-Alumina Catalyst in the Vapor Phase*

In this experiment the same apparatus was used as in Example 3 but for the phosphoric acid catalyst there was substituted 200 cc. of a synthetic silica-alumina catalyst (Manufactured by the Houdry Corp.—their code No. S-65). While the temperature of the jacket was maintained in the range of 297 to 300° C., there was fed 290 g. of 2-cyclohexen-1-ol over a 1 hour period. The reaction was exothermic and the temperature of the catalyst bed rose to 367° C. The contact time of the vapors of the alcohol in the catalyst zone was 1.2 seconds.

There was collected a total of 249 g. of product. Of this 52 g. was lower layer and 197 g. upper layer. The oil layer was analyzed by vapor phase chromatography and had the following composition:

| Component: | Percent |
|---|---|
| Benzene | 46.8 |
| 1,3-cyclohexadiene | 4.1 |
| Cyclohexene | 7.2 |
| Cyclohexane | 14.1 |
| Methyl pentene | 25.6 |
| 2-cyclohexen-1-ol | 0.9 |
| Other components | 1.2 |

EXAMPLE 5

*Dehydration of 2-Cyclohexen-1-Ol Over Alumina in the Vapor Phase*

For this experiment the apparatus described in Example 3 was used. For the phosphoric acid catalyst there was substituted 200 cc. of a commercial alumina catalyst (F-10 Alumina purchased from Aluminum Co. of America). While the temperature was maintained at 295 to 300° C., 290 g. of 2-cyclohexen-1-ol was fed over a 1 hour period. The vapors were in the catalyst zone for about 1.2 seconds. There was collected 254 g. of product. Of this, 44 g. was lower layer and 210 g. of upper layer. The oil layer was analyzed by vapor phase chromatography and was found to have this composition:

| Component: | Percent |
|---|---|
| Benzene | 3.9 |
| 1,3-cyclohexadiene | 87.0 |
| Cyclohexene | 7.5 |
| Methyl cyclopentene | 0.8 |
| Other material | 0.9 |

From Examples 4 and 5 it may be seen that the use of catalysts of types ordinarily used for vapor phase dehydrations are not satisfactory for the reaction. Even though good conversion of the starting 2-cyclohexen-1-ol is obtained, gross amounts of benzene, cyclohexene, cyclohexane and methyl pentene are produced. With such large amounts of these impurities which boil so close to 1,3-cyclohexadiene it is practically impossible to obtain a product which will have an acceptable purity. It may be seen from Example 3 that the preferred catalyst gives far superior results.

What is claimed is:

1. In the process of preparing 1,3-cyclohexadiene in which cyclohexene is oxidized to a mixture of alcohol and hydroperoxide, the hydroperoxide is reduced to 2-cyclohexene-1-ol, and the 2-cyclohexene-1-ol is dehydrated to 1,3-cyclohexadiene, the improvement which comprises dehydrating the 2-cyclohexene-1-ol by passing it in the vapor phase over a solid phosphoric acid catalyst at a temperature of 200 to 500° C.

2. The process of claim 1 wherein the 2-cyclohexen-1-ol is in contact with catalyst for a period of from 0.1 to 5 seconds.

3. The process of producing 1,3-cyclohexadiene which comprises passing 2-cyclohexen-1-ol over a solid phosphoric acid catalyst at a temperature of from 200–500° C.

4. The process of claim 3 wherein the temperature is from 250–350° C.

5. The process of claim 3 wherein the alcohol is in contact with the catalyst from 0.1 to 5 seconds.

6. The process of producing 1,3-cyclohexadiene which comprises passing 2-cyclohexen-1-ol in the vapor phase over a catalyst composed of orthophosphoric acid and diatomaceous earth at a temperature of from 250–350° C. and at a contact time of from 0.5 to 1.5 seconds.

7. The process of producing 1,3-cyclohexadiene which comprises passing 2-cyclohexene-1-ol in the vapor phase over a solid phosphoric acid catalyst at a temperature of 200° C. to 500° C.

References Cited in the file of this patent

UNITED STATES PATENTS

| 1,923,569 | Mueller-Cunradi et al. | Aug. 22, 1933 |
| 1,944,153 | Mueller-Cunradi | Jan. 23, 1934 |
| 2,866,831 | Lambert et al. | Dec. 30, 1958 |
| 2,916,528 | Jones et al. | Dec. 8, 1959 |